No. 890,176. PATENTED JUNE 9, 1908.
J. D. RIETVELD, C. DIELEMAN & W. D. RIETVELD.
MANURE SCRAPER.
APPLICATION FILED DEC. 3, 1906.
2 SHEETS—SHEET 2.
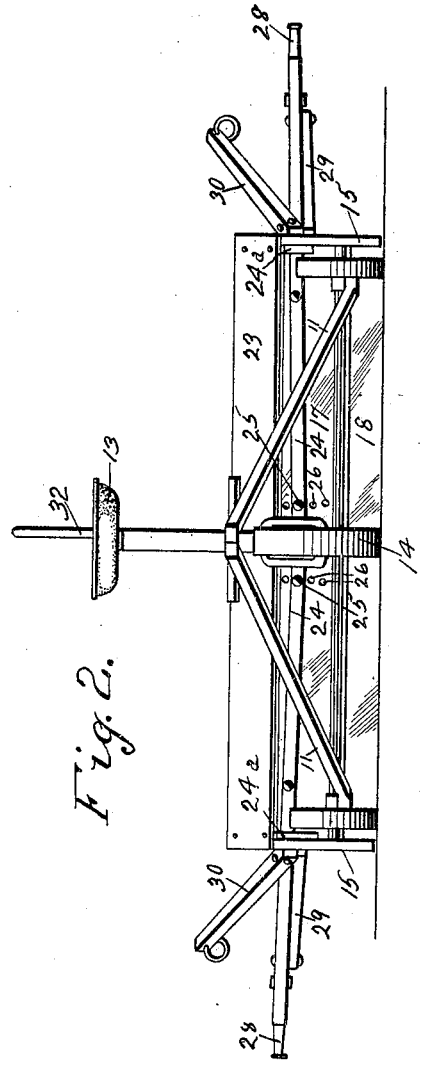
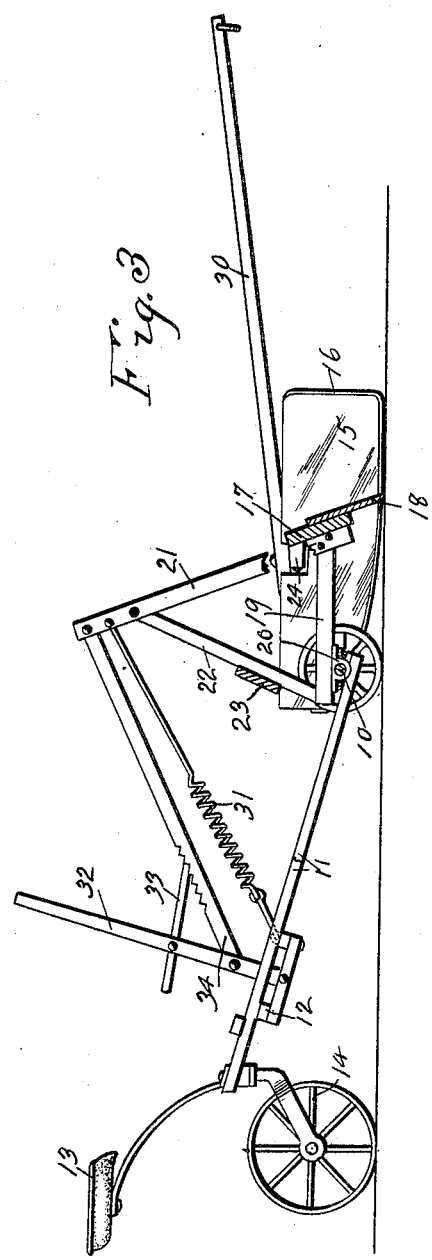
Witnesses.
K. K. Keffer.
J. B. Smutney.
Inventors.
J. D. Rietveld, W. D. Rietveld
and C. Dieleman.
by Orwig & Lane Attys.

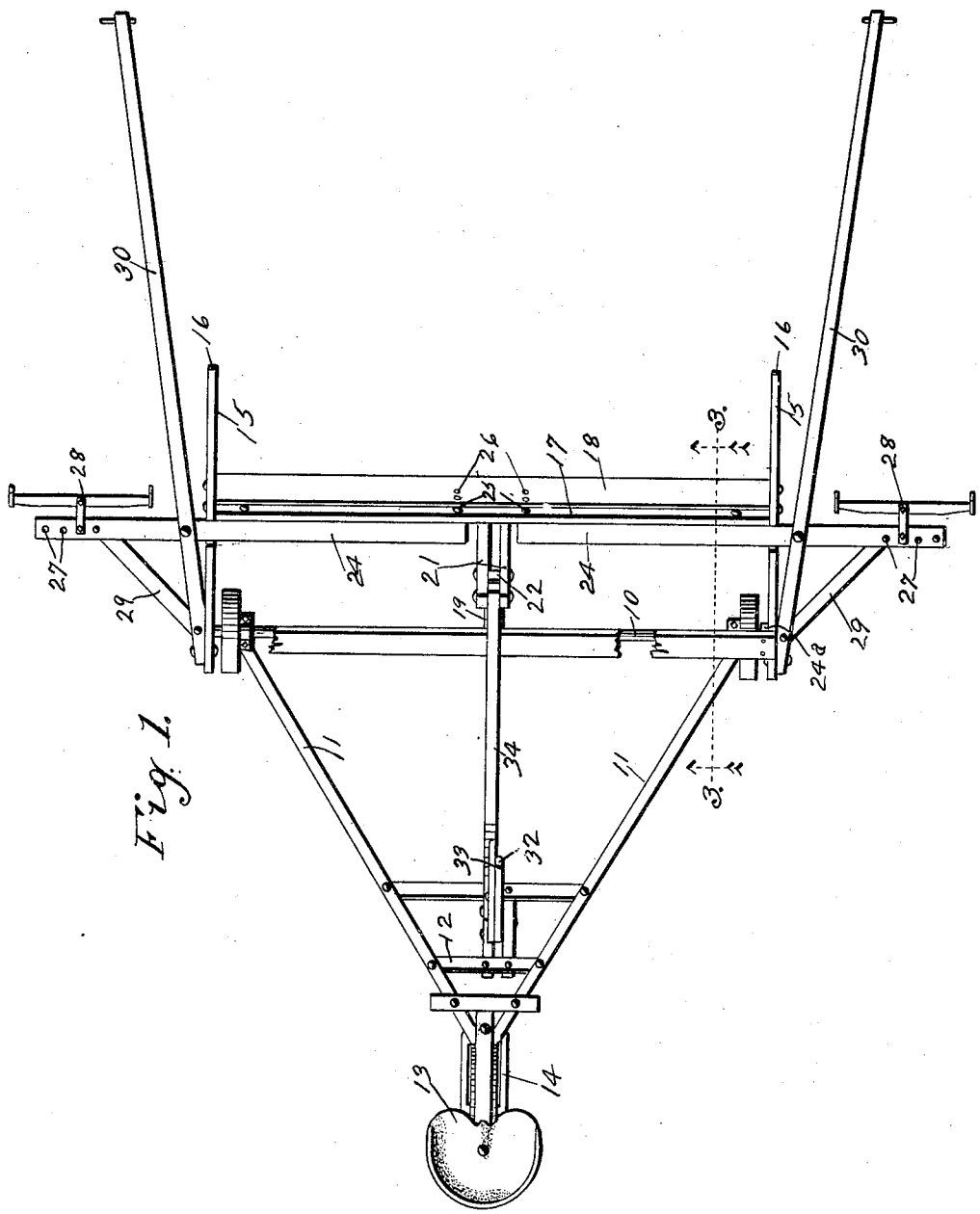

UNITED STATES PATENT OFFICE.

JOHN D. RIETVELD, CORNELIUS DIELEMAN, AND WIEGERT D. RIETVELD, OF PELLA, IOWA.

MANURE-SCRAPER.

No. 890,176.  Specification of Letters Patent.  Patented June 9, 1908.

Application filed December 3, 1906. Serial No. 346,054.

*To all whom it may concern:*

Be it known that we, JOHN D. RIETVELD, CORNELIUS DIELEMAN, and WIEGERT D. RIETVELD, citizens of the United States, residing at Pella, in the county of Marion and State of Iowa, have invented a certain new and useful Manure-Scraper, of which the following is a specification.

The object of our invention is to provide a scraper of simple, durable and inexpensive construction to be advanced by draft animals and especially designed for use in scraping up manure from the ground surface and conveying it to a manure loading device and at the same time to leave the ground upon which the manure was resting in a smooth and level condition.

A further object is to provide improved means for adjusting the scraper blade relative to the ground surface as required to make it bear more or less firmly upon the ground or as required to raise it above the ground so that the scraper may be advanced on its supporting wheels.

Our invention consists in the construction, arrangement and combination of the various parts of the device, whereby the objects contemplated are attained, as hereinafter more fully set forth, pointed out in our claims and illustrated in the accompanying drawings, in which—

Figure 1 shows a top or plan view of a complete scraper embodying our invention. Fig. 2 shows a rear end elevation of same, and Fig. 3 shows a longitudinal, sectional view on the line 3—3 of Fig. 1.

Referring to the accompanying drawings, we have used the reference numeral 10 to indicate the main axle. Connected with the said axle is the main frame comprising the converging side bars 11 and cross braces 12. At the rear of the main frame is a driver's seat 13 and a caster wheel 14 to support the rear end of the main frame. The scraper frame comprises two parallel runners 15 mounted on the ends of the main axle and extended straight forwardly, said runners preferably being reinforced or protected by the metal strips 16 at their forward and under portions. These runners are connected by means of a cross piece 17 extended from one to the other at about the central portions thereof, said cross piece being inclined rearwardly.

Fixed to the forward face of the cross piece is the scraper blade 18 with its lower edge in about the same plane as the lower edges of the runners. At the central portion of the cross piece 18, an arm 19 extends rearwardly and is provided with a bearing 20 on the axle 10. Two uprights 21 are fixed to the forward end of the part 19 and extend upwardly and rearwardly and are supported by the brace 22 which is connected to the top of the uprights 21 and to the rear of the part 19. A cross piece 23 is connected to the brace 22 and to two supports 24ᵃ on the runners 15. By this arrangement, it is obvious that a rearward movement of the top of the parts 21 will cause the scraper and the forward ends of the runners to be elevated with the shaft 10 as the pivotal center.

We have provided for attaching draft animals to the scraper as follows: On each side is a draft arm 24 having its inner end adjustably connected with the cross piece 17 by means of the bolt 25 which may be placed in any one of the row of openings 26 in the cross piece 17. The outer end portion of said draft arm rests in a notch in the top of the runner 15 and projects beyond said runner, its end portion being provided with a row of openings 27 to adjustably receive the swingle tree 28. The outer end portion of said draft arm is also preferably supported by the brace 29, which extends rearwardly and is secured to the rear of the runner 15. A tongue 30 is bolted to said brace 29 and to the draft 24 and extends forwardly and outwardly away from the adjacent runner 15. In this connection it is obvious that if the inner end of the draft arm is at its highest point of adjustment, its outer end will be depressed and the draft animal pulling upon the swingle tree 28 will tend to hold the forward end of the runners and the scraper above the ground, while if said draft arm is adjusted with its inner end at its lower limit, the lower end will be correspondingly elevated and the draft animals will tend to hold the forward ends of the runners firmly against the ground.

We have also provided means for partially supporting the weight of the forward ends of the runners and of the scraper by means of a contractible spring 31 having one end attached to the upper end of the part 21 and having its rear end attached to the main frame.

We have also provided means whereby the operator may raise or lower the forward ends of the runners and the scraper and support it at various positions of adjustment as follows: The numeral 32 indicates a lever fulcrumed to the main frame adjacent to the driver's seat. This lever is provided with a gravity pawl 33. Pivoted to the lower portion of the lever 32 is a notched bar 34 having its forward end pivoted to the top of the parts 21. Assuming the device to be in the position shown in Fig. 3, and assuming that it is desired to elevate the forward ends of the runners and the scraper, the operator pulls the lever 32 rearwardly, thus causing the notched bar 34 to draw the upper end of the parts 21 rearwardly and during this movement the lever 32 has changed its angle with relation to the notched bar to thereby hold the parts in a position in which they have been set by the lever.

In practical use and assuming that draft animals are hitched to the swingle trees, the operator directs the scraper over a part of the ground on which the material to be loaded is contained and adjusts the runner and scraper so that they will bear upon the ground to the desired degree. A quantity of the material will be engaged by the scraper and be carried over the ground surface by the scraper because the forward ends of the runners will hold it from moving beyond the ends of the scraper. The operator then directs the scraper to a point of discharge and then backs the draft animals away from the material, thus placed. The scraper blade and the runners may be adjusted to bear upon the ground to the desired amount by means of the lever 32 or by adjusting the draft arms 24 or both. The spring 31 serves to partially balance the weight of the runners and scrapers so that the operator may easily handle same.

One of the material advantages gained by the use of our improvement is that if the manure or other material is deposited in deep layers, the scraper may first be driven over the top of same and a sufficient quantity retained between the runners and then on each successive operation of the scraper, an additional layer is taken off until the ground surface is reached and the scraper will always leave the ground surface in a smooth and uniform condition free from ridges or depressions, so that after the scraper has been used in one locality, a number of times, the ground surface is left in such condition that the material resting thereon may be cleaned up thoroughly by the use of the scraper in a very quick and convenient manner.

Having thus described our invention, what we claim and desire to secure by Letters Patent of the United States, therefor is—

1. A manure scraper, comprising a frame, a scraper blade extended transversely of the frame and inclined upwardly and rearwardly, runners at the sides thereof extending forwardly beyond the scraper blade and shaped to retain material in front of the scraper blade and a yielding pressure device tending to tilt the forward ends of the runners upwardly.

2. A manure scraper, comprising a frame, a scraper blade extended transversely of the frame, runners fixed to the ends of the scraper blade and projected forwardly therefrom and manually operated means for jointly adjusting the forward ends of the runners and the scraper blade relative to the ground surface.

3. A manure scraper, comprising a forward axle, supporting wheels thereon, a frame connected with the axle, a caster wheel at the rear end of the frame, runners pivotally connected with the axle and extended forwardly, a scraper blade fixed to the runners midway between the axle and the forward ends thereof, an arm extended upwardly from the scraper blade, a spring connected with said arm and normally tending to elevate the forward ends of the runners and manually operated means for adjusting the forward ends of the runners up and down and for holding same in different positions of adjustment.

4. A manure scraper, comprising a frame, a scraper blade extended across the frame, runners connected to the ends of the scraper blade, draft arms adjustably connected at their inner ends with the scraper blade, said arms extended outwardly beyond the scraper blade and a swingle-tree at the outer end of each arm.

5. A manure scraper, comprising a frame supported on wheels, a pair of runners pivoted to said frame and extended forwardly, a scraper blade fixed to the runners midway between their forward and rear ends, two arms vertically adjustable at their rear ends with relation to the blades and having their outer ends extended beyond the runners and swingle-trees connected to the outer ends thereof.

6. A manure scraper, comprising a frame supported on wheels, a pair of runners pivoted to said frame and extended forwardly, a scraper blade fixed to the runners midway between their forward and rear ends, two arms vertically adjustable at their rear ends with relation to the blades and having their outer ends extended beyond the runners, swingle-trees connected to the outer ends thereof and a tongue projected forwardly in front of each swingle-tree.

JOHN D. RIETVELD.
CORNELIUS DIELEMAN.
WIEGERT D. RIETVELD.

Witnesses:
W. G. VAUDER PLOEG,
W. H. VANDER PLOEG.